United States Patent [19]

Bowerman

[11] 3,975,495

[45] Aug. 17, 1976

[54] METALS RECOVERY FROM HYDROCHLORIC ACID SOLUTIONS

[75] Inventor: Paul David Bowerman, Edmond, Okla.

[73] Assignee: Kerr-McGee Chemical Corporation, Oklahoma City, Okla.

[22] Filed: Feb. 2, 1976

[21] Appl. No.: 654,155

Related U.S. Application Data

[63] Continuation-in-part of Ser. No. 473,286, May 24, 1974.

[52] U.S. Cl................................. 423/55; 423/65; 423/82; 423/85; 423/122; 423/140; 423/592
[51] Int. Cl.²............... C01G 37/00; C01G 31/00; C01G 33/00
[58] Field of Search.................. 423/55, 65–67, 423/82, 85, 122, 140

[56] References Cited
UNITED STATES PATENTS

| | | | |
|---|---|---|---|
| 1,908,473 | 5/1933 | Cunningham et al.............. | 423/65 |
| 2,259,396 | 10/1941 | Schlecht et al...................... | 423/67 |
| 2,537,316 | 1/1951 | Oppegaard et al.................. | 423/66 |
| 3,063,795 | 11/1962 | Smith.................................. | 423/67 |
| 3,099,526 | 7/1963 | Li et al............................... | 423/65 |
| 3,190,719 | 6/1965 | Kelmers et al...................... | 423/67 |
| 3,790,658 | 2/1974 | Fox et al............................. | 423/67 |

*Primary Examiner*—Herbert T. Carter
*Attorney, Agent, or Firm*—William G. Addison

[57] ABSTRACT

The present invention provides a method for recovering niobium from a hydrochloric acid solution which contains niobium and vanadium and which may also contain other metals such as, for example, zirconium, titanium, iron, chromium and aluminum. Broadly, the method comprises heating such a solution at a low pH for a period of time sufficient to form a niobium-containing precipitate substantially free of vanadium. Preferably, the solution is heated in the presence of a small amount of sulfuric acid. The precipitate then is recovered from the solution.

26 Claims, No Drawings

METALS RECOVERY FROM HYDROCHLORIC ACID SOLUTIONS

CROSS-REFERENCE TO RELATED APPLICATIONS

This application is a Continuation-in-Part of application Ser. No. 473286, filed May 24, 1974.

BACKGROUND OF THE INVENTION

A common method for recovering metal values from ores containing the same includes leaching the ores with an acid. The acid solubilizes the metal values. The acid leach solution so obtained, then is processed for recovery of the metals contained therein.

Another common method of recovering metal values from ores is by chlorination of the ore in a fluid-bed reactor. Titaniferous ores such as rutile and ilmenite are chlorinated to produce titanium tetrachloride which, subsequently, is processed to produce either titanium metal or pigmentary titanium dioxide. When the chlorination is effected in a fluid-bed reactor, a substantial quantity of solids are carried out of the reactor by the effluent gases generated therein. A substantial portion of the solids comprise carbon and unreacted ore. The solids also include, however, significant amounts of anhydrous chlorides of such metals as vanadium, niobium, titanium, chromium, zirconium, aluminum and iron. In most plant operations, the solids are separated from the gas stream and quenched in water to pacify the highly reative anhydrous metal chlorides contained therein, thus, producing an aqueous solution of hydrochloric acid containing the aforementioned metal values.

Separation and recovery of metal values such as niobium and vanadium from a hydrochloric acid solution is difficult. More particularly, most metal recovery processes, applicable to hydrochloric acid solutions, remove both metals simultaneously.

Obviously, an economical method of selectively recovering metal values from a hydrochloric acid solution is desirable.

SUMMARY OF THE INVENTION

The present invention provides a method for recovering a substantially vanadium-free, niobium-containing precipitate from a hydrochloric acid solution which contains niobium and vanadium and which may or may not also contain at least one other metal selected from the group consisting of titanium, zirconium, iron, chromium and aluminum.

The invention further provides a method of separating a mixture of niobium, titanium and zirconium from a hydrochloric acid solution which contains the same and vanadium and which may or may not contain at least one other metal selected from the group consisting of iron, chromium and aluminum.

The present invention is operative utilizing hydrochloric acid solutions containing metals in addition to those mentioned hereinabove. More specifically, the invention is applicable using hydrochloric acid solutions containing metals normally present in titaniferous ores such as rutile, ilmenite and the like. Such additional metals found in titaniferous in minor amounts include but are not limited to calcium, copper, cobalt, magnesium, manganese, molybdenum, sodium, nickel, lead, silicon, tin, tantalum, tungsten and zinc. The term "hydrochloric acid solution" as used in the present specification and appended claims means solutions which may also contain the metals specified hereinabove and normally present in titaniferous ores.

Broadly, the method comprises maintaining the acid solution at a pH of less than about 2.0 and heating the solution to a temperature of from about 60°C up to the boiling temperature of the solution for a period of time sufficient to form a substantially vanadium-free, niobium-containing precipitate and recovering said precipitate from the solution. In a preferred embodiment of the present invention the precipitation is accomplished in the presence of a catalytic amount of sulfuric acid. More particularly, it has been discovered that by adding to the solution from 0.1 up to about 40 grams of sulfuric acid per liter of solution, the niobium is more readily and completely precipitated from such solutions and the filterability also is improved.

The niobium-containing precipitate is recoverable from the solution using known technology such as, for example, by filtration, centrifugation or decantation of the solution containing the other metals.

The method further provides for the subsequent recovery of the vanadium from the niobium-free acid solution and, thereafter, the recovery of the iron, chromium and aluminum.

DESCRIPTION OF A PREFERRED EMBODIMENT

Broadly, the present invention relates to a method for the selective recovery of niobium from hydrochloric acid solutions containing the same and vanadium. The hydrochloric acid solutions contemplated herein may be formed by dissolving chlorides or oxychlorides of the metals in water. The invention further provides a method for recovering niobium from a hydrochloric acid solution which contains the same as well as vanadium and which may or may not contain other metals selected from the group consisting of titanium, zirconium, iron, chromium and aluminum.

The method is applicable to hydrochloric acid solutions wherein the metal values are in a lower oxidation state. The method of the present invention also is applicable to partially oxidized solutions wherein all the metals are not in their highest valent state. Specifically, when vanadium is in the pentavalent oxidation state, co-precipitation of the niobium and vanadium may occur. Therefore, it is desirable that a major portion of the vanadium be in a lower oxidation state such as either the trivalent or tetravalent oxidation state or mixtures thereof. There is no advantage in oxidizing the solution prior to separation of the niobium, thus, it generally is preferred that the hydrochloric acid solution of metals not be oxidized.

To achieve quantitative separation between niobium and vanadium, it is essential that the pH of the acidic solution be maintained at less than about 2.0. As the pH increases above 2.0 an increasing amount of vanadium is co-precipitated. Indeed, if the pH is allowed to go as high as, for example, about 4 substantially no separation between niobium and vanadium is obtained. A preferred pH is from 0 to about 1.5 and particularly good results are obtained at a pH of about 1. Further, substantially all of the titanium and zirconium, if present, also are precipitated and substantially all of the vanadium remains in the solution when the pH is maintained at about 1.

Precipitation of niobium is effected by heating the solution to a temperature of from about 60°C up to the boiling temperature of the solution. Generally, the solution is heated to a temperature of from about 80°C up to the boiling temperature of the solution and a preferred temperature is about 90°C.

In accordance with a preferred embodiment, the precipitation is effected in the presence of from about 0.1 to 40 grams of sulfuric acid per liter of solution. The sulfuric acid may be added either prior to or during the heating step. Further, as will be obvious to those versed in the art, the sulfuric acid may be added as such or, alternatively, by the addition to the hydrochloric acid solution of a compound which will form sulfuric acid insitu. Examples of such compounds include: thiosulfates, pyrosulfuric acid, bisulfates and sulfates. Alternatively, the sulfuric acid may be formed in-situ by contacting the hydrochloric acid solution with a combination of an oxidizing agent and a bisulfite, thiosulfite or sulfurous acid.

The precise amount of sulfuric acid required in the solution for optimum results will, of course, vary depending upon the concentration and composition of the metal values in the solution. The concentration of sulfuric acid in the solution may be from as low as 0.1 grams to as high as 40 grams per liter of solution. Generally, however, it is found that the optimum concentration is within the range of from about 0.1 to about 15 grams of sulfuric acid per liter of solution. Indeed, the best separation obtained on the solutions tested is at a concentration within the range of from about 3.5 to about 7.5 grams of sulfuric acid per liter of solution.

The exact mechanism by which sulfuric acid accelerates precipitation of niobium from a hydrochloric acid solution is not fully understood. More particularly, niobium may be precipitated solely by heating the solution in the absence of sulfuric acid. However, it may take extended periods of time to achieve the same amount of precipitation of niobium as is obtained in a matter of hours in accordance with the present invention. Indeed, when the solution contains sulfuric acid in an amount of from about 0.1 to 15 gm/per liter of solution and the solution is heated to about 90°C, complete precipitation of substantially all of the niobium is obtainable in from about 3 to 6 hours. The niobium thus precipitated is readily filterable. On analysis only a small amount of sulfate is found in the precipitate (approximately 16% sulfate). If the precipitation were due solely to the formation of insoluble metal sulfates the precipitate would have significantly higher sulfate content. It is thought, therefore, that the sulfuric acid acts in some manner as a catalyst, presumably by means of nucleation, to accelerate the rate of precipitation.

The niobium-containing precipitate may be recovered, for example, by decanting the solution containing the vanadium, by filtering, centrifuging or the like. The recovered precipitate of niobium may be dried and then sold. If titanium, zirconium or mixtures thereof also are present in the precipitate, the latter may be subjected to additional processing to separate the individual metals. Separation may be achieved, for example, by chlorinating the precipitated metals to form metal chlorides followed by fractional distillation of the metal chlorides so formed.

The hydrochloric acid solution, free from niobium but still containing vanadium, then may be treated to recover the vanadium. For example, vanadium readily is precipitated from the solution at a temperature of around 50°C by adjusting the pH of the hydrochloric acid solution to about 4. Alternatively, the solution may be oxidized, using any suitable oxidizing agent, to convert substantially all lower valent vanadium to its pentavalent state whereby quantitative precipitation is obtained at a temperature of about 60°C and a pH of about 1.7. After removal of the niobium and vanadium as described above, the filtrate, if it contains iron, chromium and aluminum, may be neutralized to cause the precipitation of these later metals.

EXAMPLE I

The following example demonstrates the use of the method of the present invention to selectively recover niobium from a hydrochloric acid solution of the same and vanadium.

A solution of hydrochloric acid having a pH of about 0.5 containing niobium in an amount of 2.5 gm/per liter and vanadium in an amount of 7.0 gm/per liter is prepared. To the solution is added ammonium bisulfate in an amount sufficient to form in-situ about 4.0 gm. of sulfuric acid per liter of solution. The solution is heated to a temperature of about 90°C and held at that temperature for about 3 hours during which time a precipitate forms in the solution. The precipitate is recovered by filtration and analyzed. From the analysis it is determined that substantially all of the niobium has been removed from the solution. The precipitate is recovered by filtration and analyzed. From the analysis it is determined that substantially all of the niobium has been removed from the solution. Further, the analysis shows that substantially all of the vanadium has remained in solution.

When it is attempted to repeat the foregoing procedure without sulfuric acid in the solution it takes substantially longer to precipitate the same amount of metal. Further the precipitate so formed is more difficult to filter. Analysis of the precipitate discloses that a greater amount of vanadium is present in the precipitate although there still is a substantial degree of separation of the niobium from the vanadium.

EXAMPLE II

A quantity of blowover solids from the fluidbed chlorination of a titaniferous ore is obtained and quenched in water to form a hydrochloric acid solution having a pH of 0.5. The solution is filtered to remove coke and unreacted ore contained therein. The solution then is analyzed for metals content and found to have the following composition:

| | |
|---|---|
| Vanadium (calculated as $V_2O_5$) | 7.0 gm/l |
| Niobium | 2.5 gm/l |
| Zirconium | 5.4 gm/l |
| Titanium (calculated as $TiO_2$) | 3.0 gm/l |
| Iron | 3.0 gm/l |
| Chromium | 1.5 gm/l |
| Aluminum | 0.7 gm/l |

Additionally, the solution contained minor amounts, 0.10 gm/l or less, of each of the following metals:
Calcium
Copper
Cobalt
Magnesium
Manganese
Molybdenum
Sodium
Nickel
Lead
Silicon
Tin Tantalum
Tungsten
Zinc To a quantity of that solution is added a small amount of 98% sulfuric acid at the rate of 7.36 gm/per liter of solution and then heated to 90°C to form a precipitate. After four hours the solution is filtered to recover the precipitate. The recovered precipitate is analyzed, and it is determined that more than 99% of the niobium, 93% of the zirconium and approximately 47% of the titanium are recovered from the solution. Further, from the analysis it is determined that none of the iron, aluminum, chromium or vanadium have precipitated from hours. At the end of that time the precipitate is recovered by filtration. The filtrate is analyzed and the results are summarized in the Table.

From the Table (tests 1–11) it is seen that substantially complete separation of niobium from vanadium is obtained at the different solution pH values and with varying amounts of sulfuric acid added to the solution. Further, it is seen that when the solution pH is maintained at a value of from about 1.0 to about 2.0 (tests 9–11) it also is possible to precipitate substantially all of the titanium and zirconium while substantially all of the vanadium remains in the solution as do the iron, chromium and aluminum.

TABLE

| Test | Grams 98% $H_2SO_4$ Added to 500 ml of Solution | pH of the Solution Before $H_2SO_4$ Addition | % of Metal in the Filtrate After Recovery of the Precipitate | | | | | | |
|---|---|---|---|---|---|---|---|---|---|
| | | | Nb | Zr | Ti | $V_2O_5$ | Fe | Al | Cr |
| 1 | 0.00 | 0.5 | 62.4 | 17.4 | >64.4 | 89.74 | + | + | + |
| 2 | 1.84 | 0.5 | <0.64 | 1.63 | 40.56 | 94.02 | + | + | + |
| 3 | 3.68 | 0.5 | .32 | 7.41 | 52.67 | 99.43 | + | + | + |
| 4 | 7.36 | 0.5 | .88 | 9.48 | >53.56 | 96.30 | + | + | + |
| 5 | 11.04 | 0.5 | 4.16 | 19.26 | >57.78 | 98.29 | + | + | + |
| 6 | 14.72 | 0.5 | .8.8 | 19.89 | >59.67 | 97.15 | + | + | + |
| 7 | 18.40 | 0.5 | 18.4 | >21.48 | >64.44 | 96.87 | + | + | + |
| 8 | 3.68 | 0.5 | .32 | 7.41 | 52.67 | 99.43 | >31.6 | 100 | >63.2 |
| 9 | 3.68 | 1.0* | <.80 | 0.41 | 4.30 | 95.44 | >70.0 | 100 | 100 |
| 10 | 3.68 | 1.5* | <0.64 | 0.15 | 0.56 | 83.76 | >63.3 | 100 | >76.0 |
| 11 | 3.68 | 2.0* | <0.72 | 0.19 | 0.56 | 75.78 | >60.7 | 100 | >73.33 |

+ No Analysis made
*pH of the solution maintained at this value after addition of sulfuric acid the solution.

The foregoing procedure is repeated with a fresh quantity of the metals-containing hydrochloric acid solution except after the addition of the sulfuric acid the pH of the solution is increased to and maintained at about 1.0 by the addition thereto of an aqueous solution of a base (NaOH). When the pH of the solution is maintained at about 1.0 during the precipitation, subsequent analysis of the filtrate shows that substantially all of the niobium, more than 99% of the zirconium and about 96% titanium are precipitated. Further, substantially all of the iron, chromium and aluminum and more than 95% of the vanadium remain in solution. The presence of the minor amounts of the metals in the hydrochloric acid starting solution did not interfere with the practice of this invention.

EXAMPLE III

An additional series of tests are performed on fresh 500 ml. quantities of a metal-containing hydrochloric acid solution to demonstrate the effect of varying the pH of the hydrochloric acid solution and the use of different amounts of sulfuric acid. Each quantity of solution contains the following amounts of metal:

| | |
|---|---|
| Vanadium (calculated as $V_2O_5$) | 3.51 gm. |
| Niobium | 1.25 gm. |
| Zirconium | 2.70 gm. |
| Titanium | 0.90 gm. |
| Iron | 1.50 gm. |
| Chromium | 0.75 gm. |
| Aluminum | 0.35 gm. |

As shown in the following Table, in tests 2–8 the pH is allowed to decrease with the addition of the sulfuric acid. In tests 9–11 the pH is maintained at the indicated value after the addition of an aqueous base solution. In each test the solution is heated to and maintained at a temperature of about 90°C for a time of about four

EXAMPLE IV

This example demonstrates the recovery of vanadium from a substantially niobium-free hydrochloric acid solution. A quantity of the substantially niobium-free hydrochloric acid solution from Example III, test No. 9 is obtained and divided into two portions.

To one of the portions a sufficient amount of sodium chlorate is added to convert all vanadium contained therein to vanadium pentoxide. The solution then is heated to about 60°C and the pH of the solution is increased to and maintained at about 1.7 to form a vanadium-containing precipitate. After about 30 minutes the solution is filtered to recover the precipitate so formed. The filtrate is analyzed and it is found that greater than 99.7% of the vanadium has been precipitated.

The other portion of the solution is heated to 50°C and the pH of the solution is increased to and maintained at about 4.0 by the addition thereto of sodium hydroxide to form a precipitate containing vanadium. After about two hours the solution is filtered to remove the precipitate. The filtrate is analyzed and it is determined that greater than 99.9% of the vanadium has been precipitated.

The foregoing description and examples are intended to be illustrative only and are not to be construed as limiting the scope of the invention; reference being had to the appended claims for such latter purpose.

What is claimed is:

1. A method of recovering a substantially vanadium-free, niobium-containing precipitate from a hydrochloric acid solution which contains vanadium, a portion of which is in an oxidation state of less than five, and niobium comprising maintaining the acid solution at a pH of less than about 2.0, heating the solution to a temperature of from about 60°C up to the boiling temperature of the solution for a period of time sufficient to form a substantially vanadium-free, niobium-containing precipitate and recovering said precipitate from the solution.

2. The method of claim 1 wherein the solution is maintained at a pH of from about 0 to about 1.5.

3. The method of claim 1 wherein there is provided in the solution from about 0.1 to about 40 grams of sulfuric acid per liter of solution.

4. The method of claim 1 wherein there is provided in the solution from about 0.1 to about 15 grams of sulfuric acid per liter of solution.

5. The method of claim 1 wherein there is provided in the solution from about 3.5 to about 7.5 grams of sulfuric acid per liter of solution.

6. The method of claim 1 wherein the solution is heated to a temperature of about 90°C and maintained at that temperature for a period of time of from about 3 to 6 hours.

7. The method of claim 1 wherein, after recovery of said precipitate, the solution is oxidized to convert substantially all lower valent vanadium contained therein to vanadium pentoxide, maintaining the solution at a temperature of about 60°C and at a pH of about 1.7 for a time sufficient to form a vanadium-containing precipitate and recovering said precipitate.

8. The method of claim 1 wherein, after recovery of said precipitate, the solution is maintained at a temperature of about 50°C and at a pH of about 4 for a time sufficient to form a vanadium-containing precipitate and recovering said precipitate.

9. A method of separating a mixture of niobium, titanium and zirconium from a hydrochloric acid solution which contains the same and vanadium, a major portion of which is in an oxidation state of less than five, comprising maintaining the acid solution at a pH of less than about 2.0, heating the solution to a temperature of from about 60°C up to boiling temperature of the solution for a period of time sufficient to form a niobium, titanium and zirconium-containing precipitate substantially free of vanadium and recovering said precipitate from the solution.

10. The method of claim 9 wherein the solution is maintained at a pH of from about 0 to about 1.5.

11. The method of claim 9 wherein there is provided in the solution from about 0.1 to about 40 grams of sulfuric acid per liter of solution.

12. The method of claim 9 wherein there is provided in the solution from about 0.1 to about 15 grams of sulfuric acid per liter of solution.

13. The method of claim 9 wherein there is provided in the solution from about 3.5 to about 7.5 grams of sulfuric acid per liter of solution.

14. The method of claim 9 wherein the solution is heated to a temperature of about 90°C and maintained at that temperature for a period of from about 3 to 6 hours.

15. The method of claim 9 wherein, after recovery of said precipitate, the solution is oxidized to convert substantially all lower valent vanadium contained therein to vanadium pentoxide, maintaining the solution at a temperature of about 60°C and at a pH of about 1.7 for a time sufficient to form a vanadium-containing precipitate and recovering said precipitate.

16. The method of claim 9 wherein, after recovery of said precipitate, the solution is maintained at a temperature of about 50°C and at a pH of about 4 for a time sufficient to form a vanadium-containing precipitate and recovering said precipitate.

17. A method which comprises maintaining a hydrochloric acid solution containing vanadium, a major portion of which is in an oxidation state of less than five, niobium, titanium, zirconium, iron, chromium and aluminum at a pH of less than about 2, heating the solution to a temperature of from about 60°C up to the boiling temperature of the solution for a period of time sufficient to form a niobium, titanium and zirconium-containing precipitate and recovering said precipitate from the solution.

18. The method of claim 17 wherein the solution is maintained at a pH of from about 0 to about 1.5.

19. The method of claim 17 wherein there is provided in the solution from about 0.1 to about 40 grams of sulfuric acid per liter of solution.

20. The method of claim 17 wherein there is provided in the solution from about 0.1 to about 15 grams of sulfuric acid per liter of solution.

21. The method of claim 17 wherein there is provided in the solution from about 3.5 to about 7.5 grams of sulfuric acid per liter of solution.

22. The method of claim 17 wherein the solution is heated to a temperature of about 90°C and maintained at that temperature for a period of time of from about 3 to 6 hours.

23. The method of claim 17 wherein, after recovery of said precipitate, the solution is oxidized to convert substantially all lower valent vanadium contained therein to vanadium pentoxide, maintaining the solution at a temperature of about 60°C and at a pH of about 1.7 for a time sufficient to form a vanadium-containing precipitate and recovering said precipitate.

24. The method of claim 23 wherein, after recovery of said precipitate the filtrate subsequently is neutralized to precipitate the iron, chromium and aluminum.

25. The method of claim 17 wherein, after recovery of said precipitate, the solution is maintained at a temperature of about 50°C and at a pH of about 4 for a time sufficient to form a vanadium-containing precipitate and recovering said precipitate.

26. The method of claim 25 wherein, after recovery of said precipitate the filtrate subsequently is neutralized to precipitate the iron, chromium and aluminum.

* * * * *